United States Patent
Evjen

(10) Patent No.: US 10,222,292 B2
(45) Date of Patent: Mar. 5, 2019

(54) METHOD AND APPARATUS FOR DETECTING SHOCK

(71) Applicant: John M. Evjen, Gainesville, FL (US)

(72) Inventor: John M. Evjen, Gainesville, FL (US)

( * ) Notice: Subject to any disclaimer, the term of this patent is extended or adjusted under 35 U.S.C. 154(b) by 0 days.

(21) Appl. No.: 15/018,434

(22) Filed: Feb. 8, 2016

(65) Prior Publication Data

US 2016/0231196 A1  Aug. 11, 2016

Related U.S. Application Data

(60) Provisional application No. 62/112,941, filed on Feb. 6, 2015.

(51) Int. Cl.
  *G01M 7/08* (2006.01)
  *G01L 5/00* (2006.01)

(52) U.S. Cl.
  CPC ............. *G01M 7/08* (2013.01); *G01L 5/0052* (2013.01)

(58) Field of Classification Search
  None
  See application file for complete search history.

(56) References Cited

U.S. PATENT DOCUMENTS

| | | | | |
|---|---|---|---|---|
| 4,470,302 A | * | 9/1984 | Carte | G01P 15/04 116/203 |
| 5,269,252 A | * | 12/1993 | Nagai | G01P 15/036 116/203 |
| 5,551,279 A | * | 9/1996 | Quick | G01M 7/08 116/203 |
| 6,826,509 B2 | | 11/2004 | Crisco, III et al. | |
| 8,466,794 B2 | | 6/2013 | Mack et al. | |
| 8,537,017 B2 | | 9/2013 | Mack et al. | |
| 8,554,495 B2 | | 10/2013 | Mack et al. | |
| 8,554,509 B2 | | 10/2013 | Crisco, III et al. | |
| 9,341,527 B2 | * | 5/2016 | O'Bier, II | F41H 1/02 |
| 2011/0219852 A1 | * | 9/2011 | Kasten | A61B 5/11 73/12.04 |
| 2012/0075096 A1 | | 3/2012 | Howard et al. | |
| 2012/0077439 A1 | | 3/2012 | Howard et al. | |
| 2012/0092178 A1 | | 4/2012 | Callsen et al. | |
| 2012/0188083 A1 | | 7/2012 | Miller, II | |
| 2012/0210498 A1 | | 8/2012 | Mack | |
| 2012/0304767 A1 | | 12/2012 | Howard et al. | |
| 2012/0306639 A1 | | 12/2012 | Howard et al. | |
| 2012/0306641 A1 | | 12/2012 | Howard et al. | |

(Continued)

*Primary Examiner* — Peter J Macchiarolo
*Assistant Examiner* — Jermaine L Jenkins
(74) *Attorney, Agent, or Firm* — Saliwanchik, Lloyd & Eisenschenk

(57) ABSTRACT

The problem of detecting when a traumatic force has been sustained by the brain of an individual is solved by a shock detection device that can be installed in wearable equipment. The shock detection device can include one or more deformable supports that maintain at least one suspended weight at a specific location within a housing. When a shock of a pre-determined force is sustained by the equipment, the suspended weight and/or the one or more deformable supports will provide an indication that such a shock has occurred. Such indication can be a change in the position or state of the at least one suspended weight and/or the one or more deformable supports. Visual indicators can also be utilized to better signify when a sufficiently forceful shock has occurred.

20 Claims, 4 Drawing Sheets

(56) References Cited

U.S. PATENT DOCUMENTS

2013/0118255 A1    5/2013  Callsen et al.
2014/0039355 A1    2/2014  Crisco, III et al.
2016/0242484 A1*  8/2016  Morgan .................. A42B 3/08

* cited by examiner

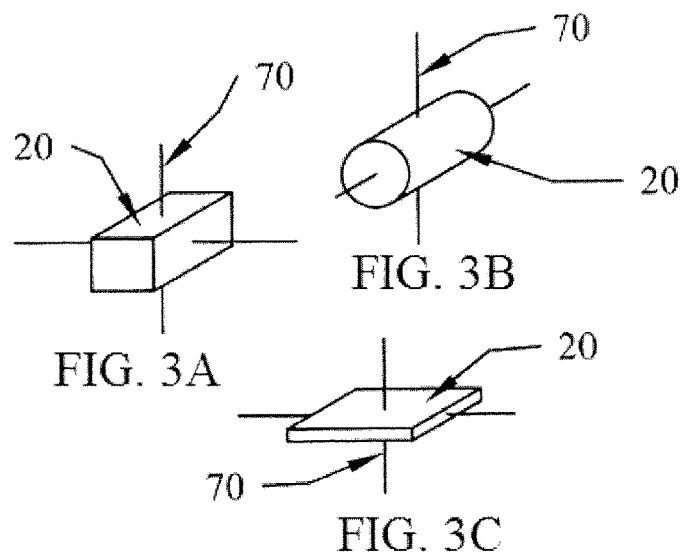
FIG. 3A
FIG. 3B
FIG. 3C
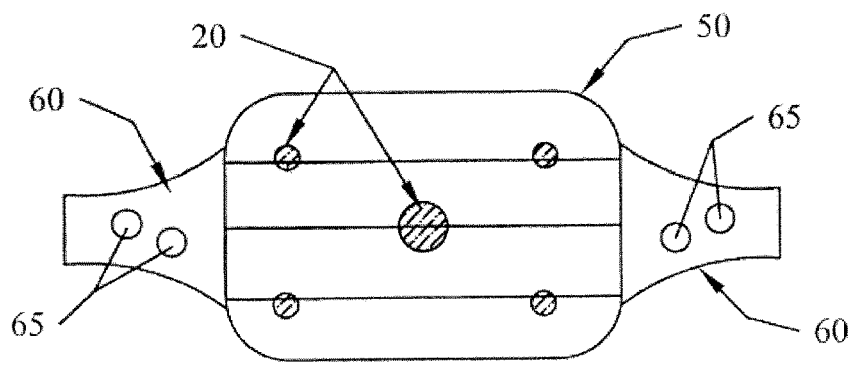
FIG. 4A
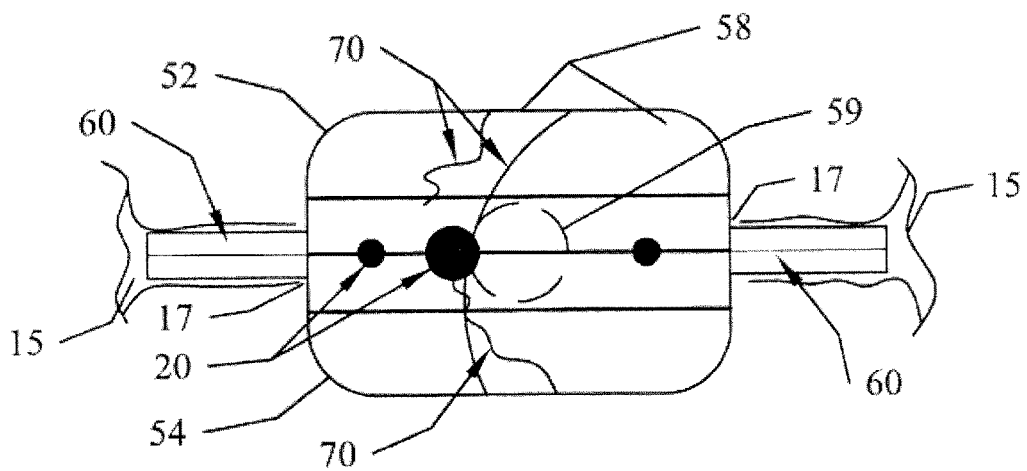
FIG. 4B

METHOD AND APPARATUS FOR DETECTING SHOCK

CROSS-REFERENCE TO RELATED APPLICATION

The present application claims the benefit of U.S. Provisional Application Ser. No. 62/112,941, filed Feb. 6, 2015, which is hereby incorporated by reference herein in its entirety, including any figures, tables, or drawings.

BACKGROUND OF INVENTION

Chronic Traumatic Encephalopathy (CTE) is a progressive degenerative brain disease that has been observed in individuals who have experienced repetitive head trauma or brain concussions, such as professional athletes, military personnel, and competitive race car drivers. It has also been observed in individuals who play non-professional or recreational sports, accident victims, and those who participate in certain types of work-related activities. Repetitive trauma to the brain can cause a progressive degeneration of the brain tissue and an increase in an abnormal tau protein in brain tissue. These effects can begin months, years, and even decades after a last concussive event to the brain. Some evidence has shown that it can take up to 3-4 weeks to fully recover from the symptoms of a concussion. Recovery may not preclude the later development of CTE, particularly if there are repeated concussive events.

There has been a significant increase is efforts to diagnose brain concussions early, so that steps can be taken to ameliorate the effects. Different types of athletic, work, and military gear have been modified and tested with various types of sensors and electronic devices to detect rapid changes in direction and impact of the head or other parts of the body. While shown to be effective, most of these devices require some type of electrical connection or secondary remote device for detection or operation of the sensors. Football, baseball, lacrosse, and military helmets have all been tested with various sensors implanted into the helmets that transmit information to another device about the types and amounts of forces exerted on the helmet, which can translate to the wearer. While effective for detecting traumatic head impact, these devices require sensors to be connected to a secondary device and some systems require multiple sensors to be implanted into the helmet or other equipment for detection of different axial forces in order to determine the force of an impact.

Unfortunately, the cost of most of these sensor devices and the complexity of implementation deter their use by anyone other than professionals. Thus, it may not be possible or cost effective for elementary, high school, recreational, or non-professional athletes to obtain and use this type of advanced equipment. There is a need for a shock sensing device, shock sensor, or shock detector, that can be easily and cost-effectively integrated into a variety of types of wearable devices and equipment. It would be further advantageous if such shock sensors could be easily monitored by the wearer or other individuals without the need for additional or secondary devices.

BRIEF SUMMARY

In accordance with embodiments of the subject invention, the problem of detecting traumatic brain injury is addressed by the use of a shock detection device that can be easily incorporated with wearable objects, such as a helmet. Embodiments of the subject invention provide a mechanical device that can show a clear indication when the device has been triggered by the device experiencing a shock greater than a threshold shock, such as the device experiencing an acceleration above a threshold acceleration due to a force exerted thereon and/or an impulse $F \times \Delta t$ above a threshold impulse within a certain period of time. Additionally, embodiments can be configured for easy removal and replacement in the wearable object and can be monitored by an individual, proximate the person wearing the wearable object to determine if a threshold, e.g., concussive, force has been reached or exceeded. In a specific embodiment, the shock detection device, the shock detector, or indicator, can be located such that the person wearing the wearable object can monitor the shock detector, or indicator.

A piece of wearable equipment, such as a helmet, headgear, or body pads, can be fitted with a shock detector having one or more components calibrated to break, bend, tear, or be otherwise deformed when a threshold shock is applied to the wearable equipment. In one embodiment, a weighted object is suspended in a chamber by one or more calibrated components. The calibrated components will impart a force tending to accelerate as the wearable equipment accelerates. If the wearable equipment, however, is accelerated or decelerated to a high rate of acceleration over a short period of time, it can generate a significant force. If a threshold shock is attained, it can cause one or more of the calibrated components to indicate that a triggering shock has occurred. The calibrated components can be configured so that the threshold shock necessary to cause an indication of a threshold shock is at least equivalent to the threshold shock necessary to potentially cause physical damage to a person wearing the equipment. In a specific example, the calibrated components can trigger an indication of a threshold shock when a shock sufficient to cause a concussion or other brain injury is exerted on the wearable object.

In one embodiment, the one or more calibrated components can be visually detectable through at least a portion of the chamber. Alternatively, when the calibrated component is broken or deformed in some way, the threshold shock can activate or trigger a signal that visually indicates that a shock sufficient to cause injury has been sustained.

Some equipment can receive significant shocks even when it is not being utilized or worn. For example, transporting or packing equipment, such as helmets, can generate forces on the equipment that are capable of accidentally triggering certain embodiments of the subject invention. With certain embodiments of the subject invention, once it has been triggered, it cannot be effectively reused until it is reset or the entire device replaced in the wearable equipment. Advantageously, certain embodiments of the subject invention can be inexpensive to manufacture and can, thus, be treated as a disposable device. In a further embodiment, the shock detection devices of the subject invention can be removable from equipment, so that they can be safely stored and/or transported and reinstalled in the equipment when necessary.

The embodiments of the subject invention can be installed and utilized in a myriad of wearable equipment. The ability to calibrate the devices for different levels of activity and force detection makes them amenable for use in a variety of situations. They can be used by professional athletes and military personnel, as well as children or amateur athletes. The simplicity of the design can make them economically feasible for anyone to use.

It should be noted that this Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIGS. 3A, 3B, and 3C illustrate alternative embodiments of suspended weights.

FIGS. 4A and 4B illustrate a top view, and a side view, respectively, of an embodiment having a housing with more than two sections that can be fit together and multiple suspended weights.

DETAILED DISCLOSURE

Figure 1:
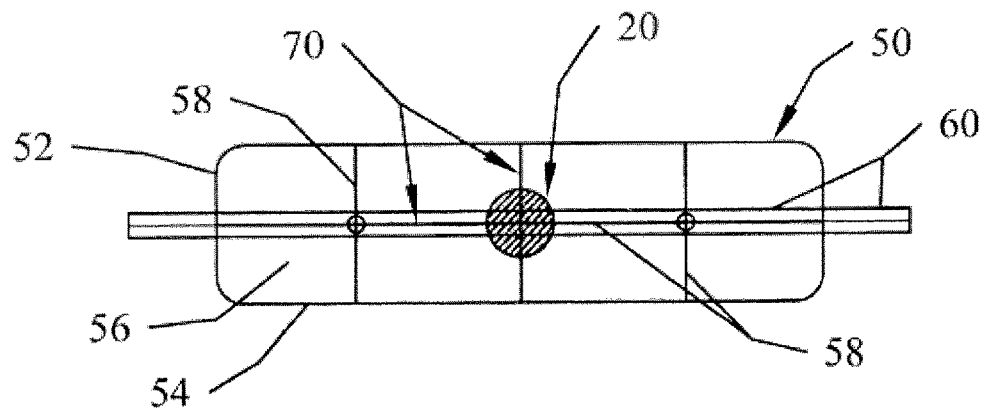
FIG. 1 illustrates a side elevation view of an embodiment of the subject invention having a suspended weight within a hollow chamber.

The subject invention describes embodiments of a shock detection device, or shock detector, that can be incorporated into wearable equipment, such as, for example, clothing, athletic gear, helmets, or other wearable object. Embodiments of the shock detector can detect when a shock exceeding a threshold shock is experienced by the wearable equipment or object. More specifically, the subject invention provides embodiments of a mechanical shock detector, or similar device, capable of being incorporated into an object or equipment worn on or about the head for detecting when the head or other part of the body is subjected to a predetermined level of traumatic force, or shock.

The following description will disclose that the subject invention is particularly useful in the field of athletics or sports-related activities, in particular, athletic or sports-related activities that can be played with or require the use of a helmet or similar device. However, a person with skill in the art will be able to recognize numerous other uses that would be applicable to the devices and methods of the subject invention. While the subject application describes, and many of the terms herein relate to, a use with sports helmets, other modifications apparent to a person with skill in the art and having benefit of the subject disclosure are contemplated to be within the scope of the present invention.

As used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

Reference will be made to the attached figures on which the same reference numerals are used throughout to indicate the same or similar components. With reference to the attached figures, which show certain embodiments of the subject invention, it can be seen that embodiments of a shock detection device 10, according to the subject invention, generally comprise a suspended weight 20 disposed within a housing 50 by one or more deformable supports 70. Alternative embodiments can include one or more indicators 100 that are triggered or activated when the state or condition of the deformable support is changed due to a traumatic force, threshold shock, and/or when a threshold impact is sustained. Each of these general components can have one or more variations or sub-components, which will be discussed in detail below. The shock detection device embodiments of the subject invention can be incorporated into one or more items of wearable equipment 15 used or worn on the body during a specific activity and capable of operating with a shock detection device to reveal when a threshold impact and/or threshold shock has been sustained by the wearable equipment and, thus, the person it is attached to.

Generally speaking, mechanical accelerometers operate by the principle that acceleration of an object can be determined by how much a mass presses on another object. Embodiments of the subject shock detection device 10 of the subject invention can incorporate the features of a mechanical accelerometer having components designed to react in some discernable way when a threshold impact, and/or threshold shock is sustained by the shock detection device. The embodiments of the subject invention can utilize at least one suspended weight 20 as the mass and one or more deformable supports 70 as objects against which the housing and the suspended weight can exert a force, such as by pressing or pulling on the deformable supports. If the deformable supports are pushed or pulled up to or beyond a threshold level, they can exhibit or trigger an indication of such, which can be visually discernable.

Figure 2:
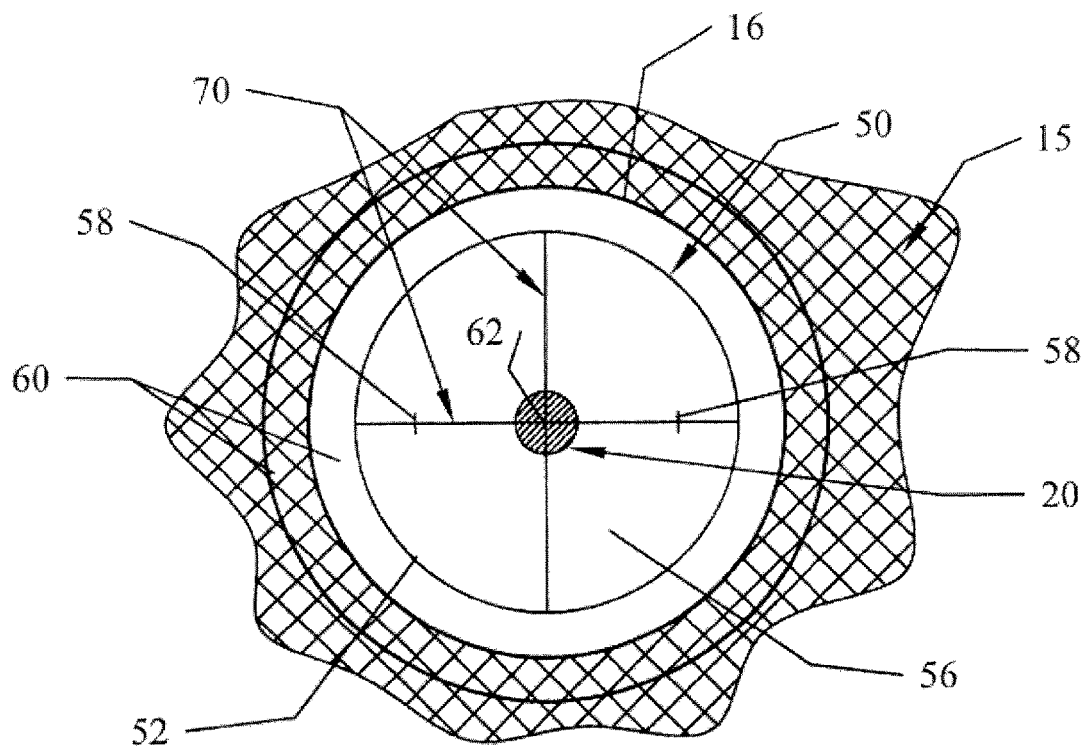
FIG. 2 illustrates a top plan view of the embodiment in FIG. 1, showing a different view of the deformable supports and suspended weight.

The configuration of a suspended weight can depend upon a variety of factors including, but not limited to, the threshold level to be calibrated for, the size, shape, and location of the housing containing the suspended weight, the type of, or use for, the wearable equipment 15 in which the suspended weight will be used, the type of deformable support utilized with the suspended weight and other factors pertaining to embodiments of a shock detection device, according to the subject invention. In general, the suspended weight can be an object having a pre-determined mass that is operably attached to or engaged with one or more deformable supports 70. The suspended weight can assume any size or shape and can comprise any one or more materials. FIGS. 1 and 2 illustrate an embodiment where the suspended weight is a substantially spherical object. A suspended weight could also assume other 3-dimensional shapes, such as a cube or cylinder, as shown in FIGS. 3A and 3B. A suspended weight can also have a more planar shape, as seen in FIG. 3C, or can realize any of a variety of other circumferential shapes, such as circular, square, triangular, or any other polygonal shape, or combinations thereof.

Likewise, the at least one material utilized for a suspended weight can depend upon several factors including, but not limited to, those listed above with regard to the shape of a suspended weight. It can be preferable, though not required, that embodiments of a shock detection device of the subject invention be sufficiently small that the operation, comfort, or aesthetic qualities of the wearable equipment are not adversely affected. Ideally, the one or more materials utilized for a suspended weight will have sufficient density that embodiments of a shock detector can be made small and unobtrusive and still operate effectively. For example, lead, iron, mercury, or combinations thereof might be suitable for a suspended weight, in addition to other materials. In one embodiment, the suspended weight is hollow and can be filled with one or more materials that increase the mass of the suspended weight. This can allow the suspended weight to be precisely calibrated for a particular type of activity, a specific type of wearable equipment 15, a specific threshold impact level, and/or a threshold shock. A person with skill in the art will be able to determine any number of configurations and materials suitable for a suspended weight. Such variations, which provide the same function, in substantially the same way with substantially the same result, are within the scope of this invention.

A housing utilized with embodiments of the subject invention can be a single or unitary structure or can have one or more pieces or sections that can be fitted or attached together to form one or more internal chambers. In one embodiment, an example of which is shown in FIGS. 1 and 2, the housing has an upper cover 52 and a lower cover 54 that can be fitted together and secured to form an internal chamber 56. FIG. 4B illustrates an example where the housing comprises more than two sections, which are attached to form an internal chamber on either side of a diaphragm deformable support, discussed below. The size and shape of the internal chambers can depend upon a variety of factors, such as, for example, where the device will be used and other factors that would be understood by a person skilled in art. FIGS. 1 and 2 illustrate an embodiment where the housing is disk-shaped with a circular-shaped circumference. FIGS. 4A and 4B illustrate an alternative embodiment where the housing has more a bulbous 3-dimensional and generally rectangular-shaped circumference. Alternative embodiments can have a housing with any suitable 3-dimensional shape, such as, for example, spherical, columnar, cone, or any other shape, and/or a circumferential shape that can include, but is not limited to, oval, square, triangular, trapezoidal, or any other polygonal shape. A person with skill in the art can determine the most appropriate shape for a housing. Such variations are within the scope of this invention.

In certain embodiments, which will be discussed later, a visual indication can be used to show when a threshold force has been reached or exceeded by the suspended weight. In a further embodiment, the visual indication is a noticeable change in the state or condition of one or more of the deformable supports 70. In an alternative embodiment, the visual indication can be a change in color, texture, location, position or other physical characteristic of the housing, one or more suspended weights, and/or one or more of the deformable supports, which can be visually discernable. In one embodiment, at least part of the housing is sufficiently clear or transparent that a visual indicator within the internal chamber 56 of the housing can be seen.

It can also be helpful for the housing and any components therein to be of sufficient size that such visual indication can be easily discerned without removing, adjusting, or otherwise altering the location or position of the shock indicator in or on the wearable equipment. In one embodiment, the housing, such as the circular top shown in FIGS. 2, FIG. 5, FIG. 6, or FIG. 8A, has a diameter of, or the housing, such as the rectangular top shown in FIG. 4A, has lengths and widths of, at least 0.25", 0.3", 0.35", 0.4", 0.45", 0.5", 0.55", 0.6", 0.65", 0.7", 0.75", 0.8", 0.85", 0.9", 0.95", 1.0", 1.05", 1.1", 1.15", 1.2", 1.25", 1.3", 1.35", 1.4" 1.45", 1.5", 1.55", 1.6", 1.65", 1.7", 1.75", 1.8", 1.85", 1.9", 1.95", and 2.0", of less than one of the listed values, and/or in a range between any two of the listed values. In a specific embodiment, the housing, such as the circular top shown in FIG. 2, FIG. 5, FIG. 6, or FIG. 8A, has a diameter of, or the housing, such as the rectangular top shown in FIG. 4A, has lengths and widths of, between approximately 0.75" and 1.25".

Specific embodiments can utilize a detector to detect when the visual indication is present, such as a change in color, and activate an audio device to produce a sound, such as an alarm, activate an optical device to produce a visual signal, such as blinking lights, send a signal to a processor or other recording device that the presence of the visual indication has occurred, and/or other information such as time, data, person, or location can be stored, processed, or transmitted.

One advantage of the embodiments of the subject invention is that they provide a shock indicator that can be single use and, thus, replaceable in the wearable equipment 15. Thus, it can be further advantageous for embodiments of the subject invention to include mounting structures 60 that can allow removal and replacement of a shock indicator of the subject invention after it has been triggered or affected by an impact. In addition, some wearable equipment can sustain significant impacts even when it is not being worn. By way of non-limiting example, football helmets and other football equipment is often packed for travel in containers that can receive significant jolts or impacts. If equipment is handled too roughly, it can trigger or at least adversely affect one or more shock detection devices attached thereto. It can be helpful if shock indicators can be removed when not needed for game play to protect the devices and then reinstalled prior to use. In one embodiment, the mounting structure 60 on a housing 50 is an external tang by which a shock detector device 10, according to the subject invention, can be permanently or temporarily secured to a piece of wearable equipment. A tang can be a projection or extension from the housing that allows the housing to be connected to a wearable equipment piece. FIGS. 1 and 2 illustrate an embodiment of a tang that extends out from the entire circumference of a housing, generally forming a ring or lip around the entire housing. FIG. 2 also illustrates a non-limiting example of how such an embodiment can be disposed and retained within an opening 16 in a piece of wearable equipment 15, so that the edges of the opening overlap the tang.

FIGS. 4A and 4B illustrate another non-limiting example of a housing having two separate tangs on opposite sides of the housing. FIG. 4B further illustrates a non-limiting example of how such an embodiment can be disposed within a hole 17 that goes through an item of wearable equipment, so that it is visible from at least two sides of the wearable equipment. In order to further secure a tang, one or more securing features 64 can be used with a tang. For example, a tang can have an adhesive for attachment to a suitable receiving surface on the wearable equipment. Alternatively, a tang can have a bore in which a screw, bolt, pin, or other device can be used. Other types of securing features 64 can also be utilized to secure an embodiment of a shock detection device, according to the subject invention, to a piece of wearable equipment. Such variations are within the scope of this invention.

As will be discussed below, the internal chamber can contain one or more deformable supports 70 and a suspended weight 20. The housing can further have one or more features or structures that aid in positioning or retaining the one or more deformable supports and a suspended weight in a pre-determined position in the internal chamber. The type of deformable support and operation of the suspended weight for a particular embodiment can determine how the configuration and type of retaining structures 58 that can be used in a housing. For example, a retaining structure 58 can be one or more features in the internal chamber 56 that aid in maintaining specific types of deformable material. For example, one or more extended surface features, such as shown, for example, in FIG. 6, can secure a gel-like deformable support, discussed below. FIG. 1 illustrates an embodiment where the retaining structure 58 is a hoop connected to one or more points on the housing, which can secure a strand-type of deformable support, also discussed below. Other types of retaining structures 58 known to those with skill in the art can also be used with housing embodiments of the subject invention. Such variations, which provide the same function, in substantially the same way, with substantially the same result are within the scope of this invention.

In addition to a suspended weight 20 and a housing, embodiments of the subject invention can include one or more deformable supports that are operably connected to or in contact with at least one suspended weight and to the housing. A deformable support can be any structure, object, material, or device with which the suspended weight can interact or affect, so as to signify when an impact threshold has been sustained. In a particular embodiment, when a threshold impact has been sustained, the suspended weight will effect a change on the deformable support that renders the deformable support unusable. Thus, a shock detector device 10 can be disposable. In an alternative embodiment, one or more deformable supports within a shock detector can be replaced and/or recalibrated making the device reusable.

Ideally, a deformable support 70 will indicate or trigger an indication of when a threshold impact has been sustained by the wearable equipment in which it is installed. It will be understood by a person skilled in the art that a deformable support 70 combined with a suspended weight 20 creates substantially an accelerometer that triggers an event when a pre-determined force is experienced by the mass therein. Such a triggering event would signify that the wearable equipment and a person wearing the equipment have sustained a pre-determined threshold impact. As mentioned above, embodiments of a shock detection device 10 of the subject invention can be made disposable or reusable. Thus, the type of deformable support used to create the triggering event can depend upon whether the shock detection device will be disposable or whether the deformable supports will be replaceable for reuse. Ideally, the type of wearable equipment and the activity engaged in during use will be taken into consideration when determining the type, number, and location of deformable supports within a housing.

In one embodiment, a deformable support 70 is an elongated strand of material having at least two ends fixedly attached to the housing. Such a strand can have a consistent or variable diameter along its length. There can be one or multiple strands fixedly attached within the housing. The one or multiple strands can also be fixedly attached in any direction within the housing. FIGS. 1 and 2 illustrate one example of a housing having three deformable supports 70 in the form of elongated strands fixedly attached in different directions to the housing so that they cross the internal chamber 56.

In a further embodiment, the suspended weight can be suspended within the internal chamber, so that it has an operable contact with each of the strands. This can entail physically attaching the suspended weight 20 to one or more strands or ensuring that the suspended weight makes or can make contact with one or more strands. In a specific embodiment, two or more strands form a nexus 62 where a suspended weight can be operably connected to each of the strands. In a further embodiment, a suspended weight can be supported by the strands in a specific area of the housing, such as, for example, centered within the internal chamber 56, as shown in FIGS. 1 and 2. In a still further embodiment, there can be more than one suspended weight utilized and each suspended weight can be operably connected to one or more of the deformable support strands. Utilizing this embodiment, the strands can be configured or calibrated so that when a threshold impact is sustained by the shock detection device 10 one or more of the strands will break. In a particular embodiment, the strands and the suspended weights are arranged so that a threshold force sustained from any direction will trigger one or more of the strands to break.

Figure 5:
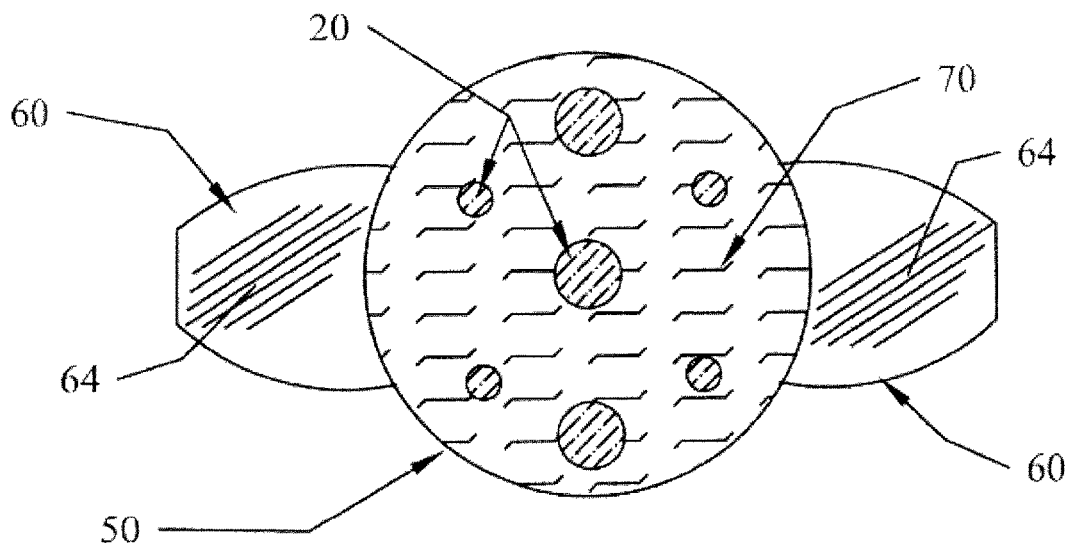
FIG. 5 is a top plan view of an embodiment utilizing a diaphragm for a deformable support with multiple weights attached to different parts of the diaphragm
Figure 6:
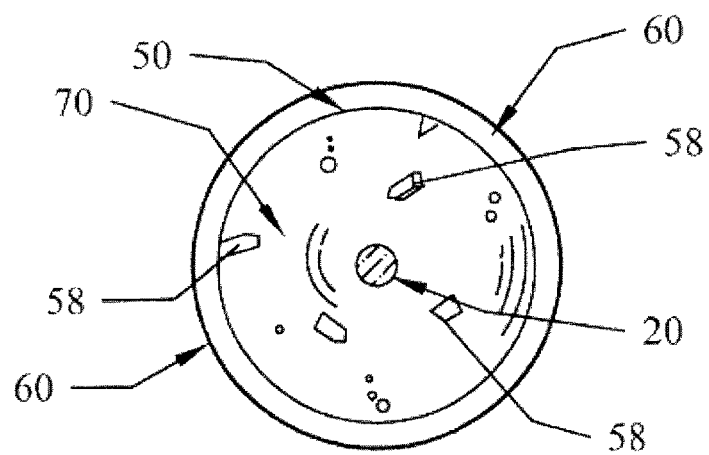
FIG. 6 is an illustration of an embodiment of a shock detection device, according the subject invention, which utilizes a gel as the deformable support.

In an alternative embodiment, the deformable support is a diaphragm that extends across the internal chamber. The diaphragm can be aligned in any direction. FIG. 5 illustrates an embodiment where the diaphragm extends across the center of the internal chamber. One or more suspended weights can be fixedly attached anywhere on the diaphragm. FIG. 5 further illustrates an embodiment that utilizes multiple suspended weights of different mass attached to the deformable support diaphragm. With this embodiment, when a threshold impact is sustained, the force of one or more of the suspended weights will cause the diaphragm to rip or tear, such that the suspended weights are no longer aligned, indicating that the shock detection device 10 has been triggered. When this embodiment is employed with an at least partially clear or transparent housing, the misalignment of one or more of the suspended weights can be seen. It is also possible for the diaphragm to be warped or stretched out of place, which could indicate a significant force has been sustained, though not at a threshold level.

Figure 7:
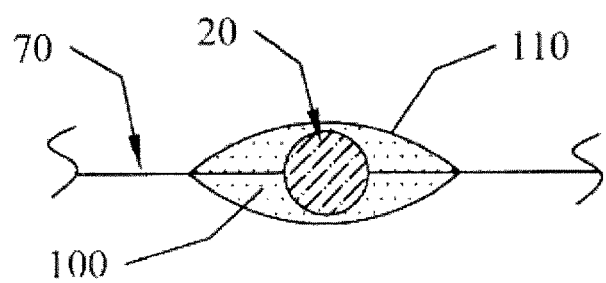
FIG. 7 illustrates an alternative embodiment of a suspended weight surrounded by a frangible membrane filled with a dye material.

In yet another embodiment, a deformable support can be one or more materials or substances that fill all or part of one or more internal chambers. In one embodiment, a gel material of one or more components is used to fill the at least one internal chamber and the suspended weight 20 can be positioned within the gel material in a specific location. FIG. 7 illustrates an embodiment where the housing is essentially spherical and filled with a gel material that supports the suspended weight at substantially the center of the sphere. The viscosity of the gel can be adjusted to hold the suspended weight in position during normal activity or if less than threshold forces are exerted on the device. However, when a threshold force is sustained by the shock detection device, the suspended weight will move within the gel material. Movement of the suspended weight by a pre-determined distance can be an indication that the device has been triggered and a threshold force has been sustained. Movement of the suspended weight less than the pre-determined distance can indicate that a significant force was sustained, but was not at a triggering level.

In an embodiment where at least part of the housing is clear or transparent, mentioned above, the broken strands can be seen through the housing. The breaking of one or more of the strands can also cause a visible shift in the position of the suspended weight, which can also be visually seen. In a further embodiment, the housing can have one or more alignment marks 59 that can be used to determine when a strand is broken and/or when the suspended weight has shifted due to a broken strand. FIG. 4B illustrates an example where a housing has a circular alignment mark 59 to indicate where the weight should be located normally and when the weight has shifted out of the alignment circle due to a change in the deformable support. It is also possible for the deformable supports to be bent or stretched, which could indicate that a significant force, though not a threshold force, has been sustained.

It can also be helpful to know the direction from which a threshold force was received or the action of the body after receiving a threshold force. A shock detection device can be configured so that the location of the suspended weight and/or the change in state or position of a deformable support can provide other information about the threshold force that was received. For example, deformable supports in the form of strands can be arranged so that certain ones will break or deform when a threshold force is received from a particular direction. A diaphragm deformable support can be positioned so that certain weights attached to the diaphragm will tear or stretch the diaphragm when a threshold force is sustained from a pre-determined direction. If a gel deformable support is used, the motion of the suspended weight in the gel can cause visible rips or channels in the gel that indicate the direction of the threshold impact. It is within the skill of a person trained in the art, having benefit of the subject disclosure, to arrange one or more deformable supports in such a way that information about the direction from which the threshold force was received can be determined. Such variations are within the scope of this invention.

Some wearable equipment may require or benefit from the use of smaller types of shock detection devices. In smaller devices, it can be difficult to determine 'in the field' whether a threshold force has been sustained. It can be beneficial if a visual indicator 100 is incorporated into one or more components of a shock detection device. Such a visual indicator can be seen with the naked eye or could require a secondary device to enhance, detect, or identify a change in the device that would indicate a threshold force shock.

In one embodiment, a deformable support can include one or more visual indicators 100 that appear or are visible only when the state or condition of the deformable support change. By way of non-limiting example, a deformable support that is a strand or a diaphragm can have one or more inner linings that only appear or are visible when the strand or diaphragm is broken or, perhaps, stretched to a certain point by the suspended weight. By way of further example, FIG. 7 illustrates an embodiment where the suspended weight is surrounded by a membrane 110 that contains a highly visible material. The membrane is fixedly attached to one or more strands of the deformable support. When a threshold force is sustained, the strand can break or pull the member causing it to break open, releasing of the visible material into the internal chamber 56. The visible material can be seen on the walls of the internal chamber or, if the internal chamber is filled with a gel deformable support, the visible material can leach into the gel, creating a visible indication that the device has been triggered.

Figure 8A:
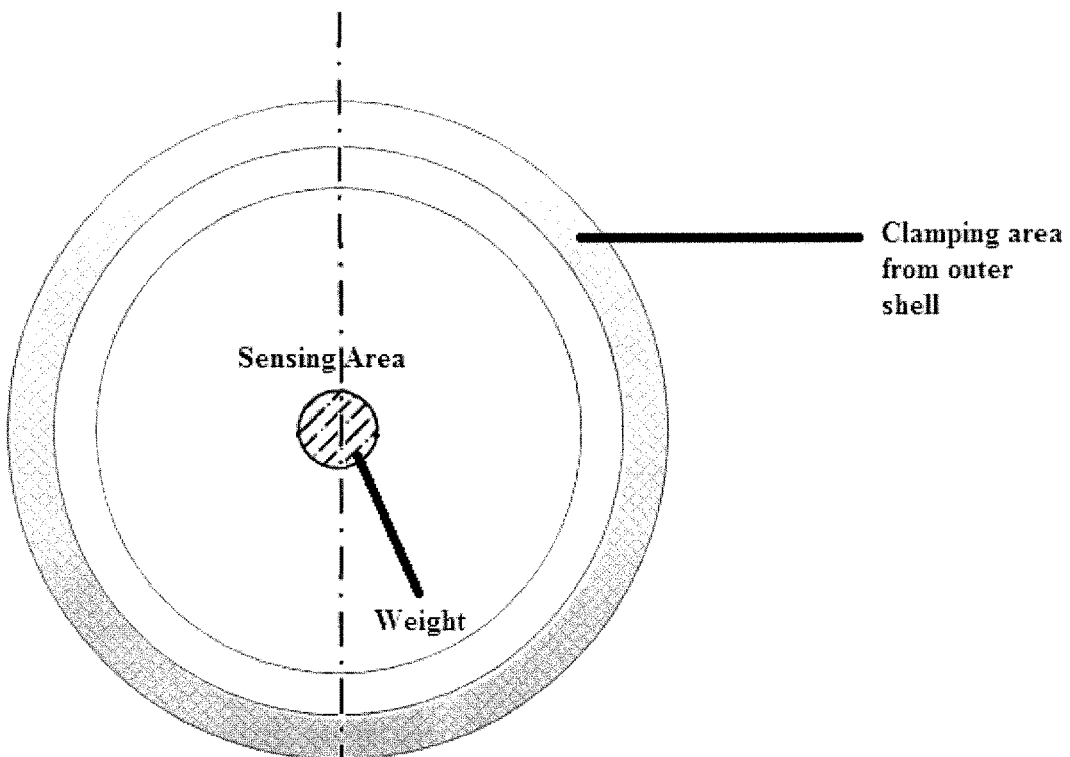
FIGS. 8A-8B show a top view, and a side view, respectively, of an embodiment of the subject invention.
Figure 8B:
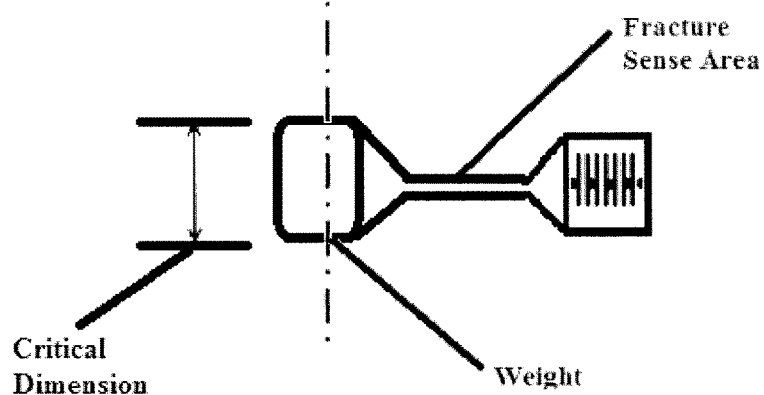

The embodiment shown in FIGS. 8A-8B incorporates a sensing element 80, which has a membrane, or diaphragm, such as a circular plastic membrane, and an activating weight 20 in the center. FIG. 8A shows a top view with the weight in the center of the membrane, and FIG. 8B shows a side view of a cross-section through the weight, showing the attachment of the membrane to the weight in a manner that leaves the ends of the weight bare (top and bottom of weight in FIG. 8B), to allow precise control of the weight in the critical dimension shown in in FIG. 8B, and shows the outside edge of the membrane for clamping, as well as the fracture sense are, where the membrane will fracture upon the sensor experiencing a threshold acceleration. A stress riser is shown is shown where the membrane attaches to the weight, and a stress riser is shown near the outer edge that is clamped by the housing or other membrane holder. This embodiment can provide equal sensitivity in all directions in the plane of the membrane (plane of the page for FIG. 8A). If a sporting headgear, or other article worn by a user, incorporated three of the sensing elements 80, positioned such that the membranes of the three sensing elements 80 were in the three mutually perpendicular planes, then the overall sensitivity of the headgear, or other article, would be complete in all directions. Specific embodiments can use 6, 9 12, or other number of individual sensors to provide more planes of sensitivity. The detector, or sensing element, can have an oval assembly, rather than a circular assembly, such that different levels of sensitivity in the two perpendicular directions of the major and minor axes of the oval, in the plane of the membrane, can be provided.

The covers of the housing can be at least partially transparent, and preferably, at least on a portion of at least one side of the sensing element, such that the visual indicator of membrane, or diaphragm, breakage due to excessive shock will be visually detectable without disassembling the unit i.e. through the at least partially transparent portion of the cover. As an example, the membrane can be a color that shows breakage when the membrane breaks. Examples of materials that can be used as covers include rigid transparent plastic and tempered glass. A specific embodiment incorporates two sections, or halves, of tempered glass used to encapsulate the membrane, or diaphragm sensor. The two sections, or halves can be fastened via a variety of techniques, such as with a heat (or other) shrinkable band around the outer edge where the two sections meet. Such bands are used in commercial packaging of groceries, such as ice cream cartons.

Embodiments in accordance with the subject invention can incorporate one or more of the following features:

A diameter of the membrane, or diaphragm, can be at least 0.25", 0.3", 0.35", 0.4", 0.45", 0.5", 0.55", 0.6", 0.65", 0.7", 0.75", 0.8", 0.85", 0.9", 0.95", 1.0", 1.05", 1.1", 1.15", 1.2", 1.25", 1.3", 1.35", 1.4" 1.45", 1.5", 1.55", 1.6", 1.65", 1.7", 1.75", 1.8", 1.85", 1.9", 1.95", and 2.0", of less than one of the listed values, and/or in a range between any two of the listed values, which can allow the device to be placed into the space available inside the helmet or other wearable article.

A cylindrical lead activating weight can be extruded, then cut off and coin pressed accurately in the axial critical dimension relative to the inside dimension of the housing, where the axial direction is normal to the plane of the membrane. In specific embodiments the activating weight must be slightly shorter, in the axial direction, than the inside dimension of the housing such that the activating weight cannot break the membrane due to axial travel, but the activating weight is still free to move in the plane of the membrane.

A variety of colors can be used for the visual indicator and partial or complete transparency of the membrane and/or cover, or housing sections, for visibility from the exterior of the housing.

A variety of types of plastic can be used for the membrane and/or cover, or housing sections.

The strength of the membrane (fracture acceleration) can be adjusted as a function of the thickness and other variables of the membrane.

A variety of materials, such as materials other than lead, can be used for the high density activating weight.

Clamping of the membrane outside diameter can be performed in a manner to minimize the stress riser area. The junction between the cylinder weight (with bare ends for dimensional control) and the center of the membrane can be accomplished so as to achieve angular uniformity about an axis in the axial diameter.

Embodiments can be "design calibrated" to break at different levels of acceleration, to be used for different ages or skill level of participants.

Embodiments can be used with a skull cap design such that the sensor responds directly to the accelerations of the skull of the wearer inside the helmet, as the acceleration of the skull is less than the acceleration of the helmet shell, by the amount of mitigation provided by the padding inside the helmet.

Embodiments can attach to the inside surface of the helmet shell, e.g. football helmets, and fracture at a higher level of acceleration. The difference between skull cap mount and helmet shell mount, could be the amount of the shock mitigation provided by the helmet cushioning, so as to yield the same sensitivity in terms of the acceleration of the skull.

Embodiments can be used in the pockets of a "skull" cap to be worn by soccer players, who normally do not wear helmets for protection, yet are increasingly subject to head collision trauma with other players, the ball, or immovable objects on the field.

A variety of shapes of the membrane, other than circular or oval, can be used. Embodiments can use a "PLUS" shape of "calibrated" thickness, with or without thinner webbing between the arms of the "plus".

Embodiments can be filled with damping liquid and sealed permanently, or can be designed to be repairable in the field and thus more affordable.

Design the threshold accelerations based on the results of the various experimental programs, presently in progress, using electronically transmitted actual field shock data, to design a series of membranes to yield calibrated shock sensitivities over the appropriate range. The exact "calibrated" values to be used can be determined based on medical expertise and the ages of the players.

A specific embodiment incorporates a uniform circular design that is 3-D printable, optionally incorporating a clam shell housing that can be opened to replace a the fractured membrane in the field.

It should be understood that the examples and embodiments described herein are for illustrative purposes only and that various modifications or changes in light thereof will be suggested to persons skilled in the art and are to be included within the spirit and purview of this application.

The scope of the invention is not limited by the specific examples and suggested procedures and uses related herein since modifications can be made within such scope from the information provided by this specification to those skilled in the art.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and that various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

The invention claimed is:

1. A device for detecting a shock on an object, the device comprising:
   a housing having an internal chamber;
   at least one deformable support ; and
   a suspended weight disposed within the internal chamber of the housing,
   wherein the at least one deformable support is operably connected to the suspended weight such that the suspended weight is fixedly attached to the at least one deformable support, and the at least one deformable support is operably connected to the housing, such that the suspended weight is maintained in a specific location within the internal chamber by the at least one deformable support;

wherein, when a shock having a magnitude greater than a predetermined magnitude value in a certain direction with respect to the housing is sustained by the housing, the suspended weight will move within the internal chamber causing a deformation of one or more deformable supports of the at least one deformable support that indicates the shock having the magnitude greater than the predetermined magnitude value was sustained by the housing.

2. The device according to claim 1, wherein the device is configured to be operably attached to a piece of wearable equipment, and wherein the device is configured such that, when the device is operably attached to the piece of wearable equipment in a certain relative orientation between the device and the piece of wearable equipment, the one or more deformable supports of the at least one deformable support deforms when the shock having the magnitude greater than the predetermined magnitude value is sustained by the wearable equipment.

3. The device according to claim 2,
wherein the shock having the magnitude greater than the predetermined magnitude value is sufficient to cause a brain injury in a person wearing the piece of wearable equipment on the person's head.

4. The device according to claim 3, further comprising:
a visual indicator,
wherein the visual indicator visually indicates when the shock having the magnitude greater than the predetermined magnitude value has been sustained by the wearable equipment.

5. The device according to claim 1,
wherein the deformation of the one or more deformable supports of the at least one deformable support comprises one or more of the following:
a rip;
a tear;
a break; and
a bend.

6. A device for detecting a threshold shock, comprising:
a housing having an internal chamber;
a weight disposed within the internal chamber of the housing; and
at least one deformable support,
wherein the weight is maintained in an initial position within the internal chamber by the at least one deformable support,
wherein when the housing undergoes a shock in a certain direction with respect to the housing that exceeds the threshold shock, a first one or more forces acting on the at least one deformable support by the housing and a second one or more forces acting on the at least one deformable support by the weight causes a deformation of the at least one deformable support, and causes an indication that the housing experienced the shock in the certain direction with respect to the housing that exceeded the threshold shock,
wherein the deformation of the at least one deformable support comprises one or more of the following:
a rip;
a tear;
a break;
a channel; and
a bend.

7. A piece of wearable equipment, comprising:
a device for detecting a threshold shock according to claim 6.

8. The device for detecting a threshold shock according to claim 6,
wherein the housing experiences the shock in the certain direction with respect to the housing that exceeds the threshold shock when the housing experiences an acceleration above a threshold acceleration due to one or more forces exerted on the housing.

9. The device for detecting a threshold shock according to claim 6,
wherein the housing experiences the shock in the certain direction with respect to the housing that exceeds the threshold shock when the housing experiences an impulse above a threshold impulse due to one or more forces exerted on the housing within a certain period of time.

10. The device for detecting a threshold shock according to claim 6,
wherein the at least one deformable support is a gel, and wherein the weight is suspended in the gel.

11. The device for detecting a threshold shock according to claim 10,
wherein the gel is in contact with the housing.

12. The device for detecting a threshold shock according to claim 10,
wherein the deformation of the gel comprises one or more of the following:
a rip in the gel; and
a channel in the gel.

13. The device for detecting a threshold shock according to claim 10,
wherein the at least one deformable support comprises a membrane that contains a visible material,
wherein the deformation of the one or more deformable supports of the at least one deformable support comprises a breaking of the membrane so as to release the visible material into the internal chamber,
wherein the release of the release of the visible material into the internal chamber is a visual indicator that the housing experienced the shock in the certain direction with respect to the housing that exceeded the threshold shock.

14. The device for detecting a threshold shock according to claim 6,
wherein the at least one deformable support is a membrane, and
wherein the weight is connected to the membrane such that the weight is fixedly attached to the membrane.

15. The device for detecting a threshold shock according to claim 14,
wherein the membrane is connected to the housing.

16. The device for detecting a threshold shock according to claim 6,
wherein the at least one deformable support is one or more elongated strands of material, and
wherein the weight is connected to the one or more elongated strands of material such that the weight is fixedly attached to the one or more elongated strands of material.

17. The device for detecting a threshold shock according to claim 16,
wherein the one or more elongated strands of material are connected to the housing.

18. The device for detecting a threshold shock according to claim 6, further comprising:
one or more restraining structures,
wherein the one or more restraining structures are connected the housing and connected to the at least one deformable support and secure the at least one deformable support.

19. The device for detecting a threshold shock according to claim 6,
wherein at least a portion of the housing is at least partially transparent.

20. A piece of wearable equipment, comprising:
a device for detecting a shock on an object according to claim 6.

* * * * *